United States Patent
Yamasaki et al.

(10) Patent No.: US 10,104,258 B2
(45) Date of Patent: Oct. 16, 2018

(54) INFORMATION PROCESSING APPARATUS AND IMAGE PROCESSING APPARATUS INCLUDING USER GAZE BASED SHIFTING FROM A FIRST STATE TO A SECOND STATE HAVING A SMALLER ELECTRIC POWER CONSUMPTION

(71) Applicant: FUJI XEROX CO., LTD., Tokyo (JP)

(72) Inventors: Hideki Yamasaki, Kanagawa (JP); Yuichi Kawata, Kanagawa (JP); Ryoko Saitoh, Kanagawa (JP); Yoshifumi Bando, Kanagawa (JP); Kensuke Okamoto, Kanagawa (JP); Tomoyo Nishida, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/490,184

(22) Filed: Apr. 18, 2017

(65) Prior Publication Data
US 2018/0115673 A1    Apr. 26, 2018

(30) Foreign Application Priority Data
Oct. 20, 2016 (JP) .................................. 2016-206101

(51) Int. Cl.
*G06F 3/12* (2006.01)
*H04N 1/00* (2006.01)
*H04N 1/44* (2006.01)

(52) U.S. Cl.
CPC ..... *H04N 1/00896* (2013.01); *H04N 1/00251* (2013.01); *H04N 1/00336* (2013.01); *H04N 1/442* (2013.01); *H04N 2201/0094* (2013.01)

(58) Field of Classification Search
None
See application file for complete search history.

(56) References Cited

U.S. PATENT DOCUMENTS

| 2015/0237227 A1* | 8/2015 | Saisho ............... H04N 1/00875 348/77 |
| 2015/0338899 A1* | 11/2015 | Kurahashi ................. G01J 5/10 307/117 |
| 2017/0163829 A1* | 6/2017 | Fujioka ............. H04N 1/00891 |

FOREIGN PATENT DOCUMENTS

JP     2010-157789 A     7/2010

* cited by examiner

*Primary Examiner* — Henok A Shiferaw
(74) *Attorney, Agent, or Firm* — Oliff PLC

(57) ABSTRACT

An information processing apparatus includes a controller that controls the information processing apparatus to shift from a first state concerning electric power consumption to a second state in which electric power consumption is smaller than the electric power consumption in the first state; and a gaze detection unit that detects a gaze toward the information processing apparatus. The controller controls the information processing apparatus to shift from the first state to the second state in a case where the gaze detection unit has not detected a gaze toward the information processing apparatus.

7 Claims, 8 Drawing Sheets

FIG. 10
| REGION IN IMAGE | PERIOD FOR DETERMINATION |
|---|---|
| D1 | H1 |
| D2 | H2 (H2 < H1) |
FIG. 11
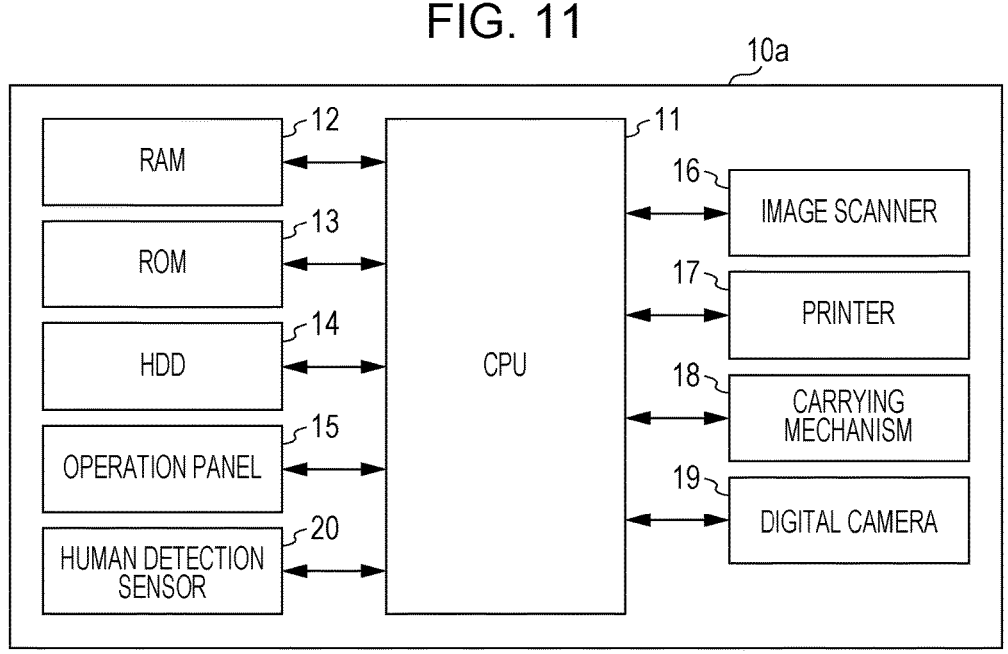
FIG. 12
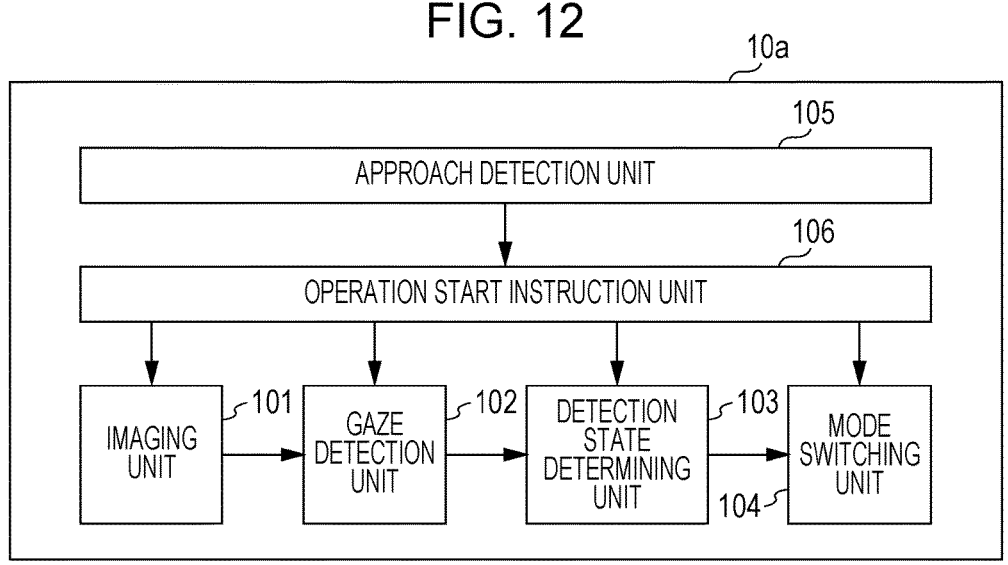

INFORMATION PROCESSING APPARATUS AND IMAGE PROCESSING APPARATUS INCLUDING USER GAZE BASED SHIFTING FROM A FIRST STATE TO A SECOND STATE HAVING A SMALLER ELECTRIC POWER CONSUMPTION

CROSS-REFERENCE TO RELATED APPLICATIONS

This application is based on and claims priority under 35 USC 119 from Japanese Patent Application No. 2016-206101 filed Oct. 20, 2016.

BACKGROUND

Technical Field

The present invention relates to an information processing apparatus and an image processing apparatus.

SUMMARY

According to an aspect of the invention, there is provided an information processing apparatus including: a controller that controls the information processing apparatus to shift from a first state concerning electric power consumption to a second state in which electric power consumption is smaller than the electric power consumption in the first state; and a gaze detection unit that detects a gaze toward the information processing apparatus, wherein the controller controls the information processing apparatus to shift from the first state to the second state in a case where the gaze detection unit has not detected a gaze toward the information processing apparatus.

BRIEF DESCRIPTION OF THE DRAWINGS

An exemplary embodiment of the present invention will be described in detail based on the following figures, wherein:

FIG. 10 illustrates an example of a detection period table;

FIG. 11 illustrates a hardware configuration of an image processing apparatus according to a modification;

FIG. 12 illustrates a functional configuration realized by the image processing apparatus;

DETAILED DESCRIPTION

[1] Embodiment

Figure 1:
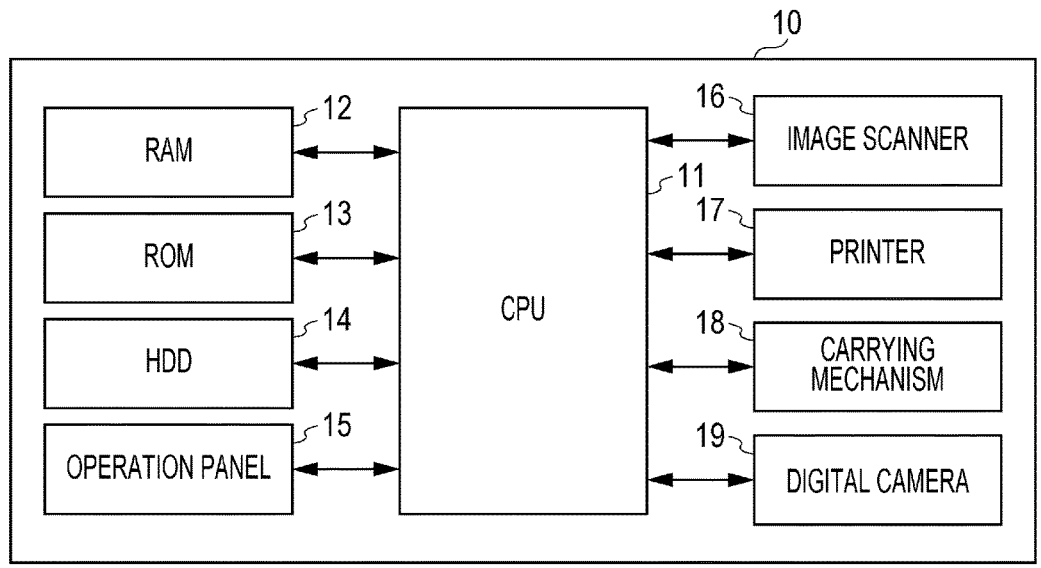
FIG. 1 illustrates a hardware configuration of an image processing apparatus according to an exemplary embodiment.

FIG. 1 illustrates a hardware configuration of an image processing apparatus 10 according to an exemplary embodiment. The image processing apparatus 10 offers image processing functions such as a scan function, a print function, a copy function, and a facsimile function. The image processing apparatus 10 is a computer that includes a central processing unit (CPU) 11, a random access memory (RAM) 12, a read only memory (ROM) 13, a hard disk drive (HDD) 14, an operation panel 15, an image scanner 16, a printer 17, a carrying mechanism 18, and a digital camera 19.

The CPU 11 controls operation of each unit by executing a program stored in the ROM 13 or the HDD 14 by using the RAM 12 as a work area. The HDD 14 is a storage unit in which data and a program used for control by the CPU 11 are stored. Note that the storage unit is not limited to an HDD and can be another kind of recording medium such as a solid state drive (SSD).

The operation panel 15 includes a touch screen, a button, and the like. The operation panel 15 not only displays information on a state of the image processing apparatus 10, a state of processing, and the like, but also accepts a user's operation by displaying an image of an operator or the like and accepts an operation that is input by pressing of the button. That is, the operation panel 15 is an example of an operation accepting unit that accepts an operation of the image processing apparatus 10. The image scanner 16 includes an image sensor and the like and optically reads an image on a surface of a sheet of paper. The image scanner 16 supplies image data representative of the read image to the CPU 11.

The printer 17 forms an image on a sheet of paper, for example, by electrophotography. Each of the image scanner 16 and the printer 17 is an example of a processing unit that performs processing on a sheet of paper. The carrying mechanism 18 is a mechanism for carrying a sheet of paper and carries a sheet of paper having an image to be read by the image scanner 16 and a sheet of paper on which an image is to be formed by the printer 17. The digital camera 19 includes a lens, an image sensor, and the like and takes an image of a person and landscape around shown by light incident from the lens. In the present exemplary embodiment, the digital camera 19 is a visible camera that takes an image by using visible light. Note that the digital camera 19 may be an infrared camera that takes an image by using infrared rays or may be an integrated camera that takes an image by using both infrared rays and visible light. Each of the image scanner 16, the printer 17, and the carrying mechanism 18 is an example of an image processing unit according to the present invention.

Figure 2:
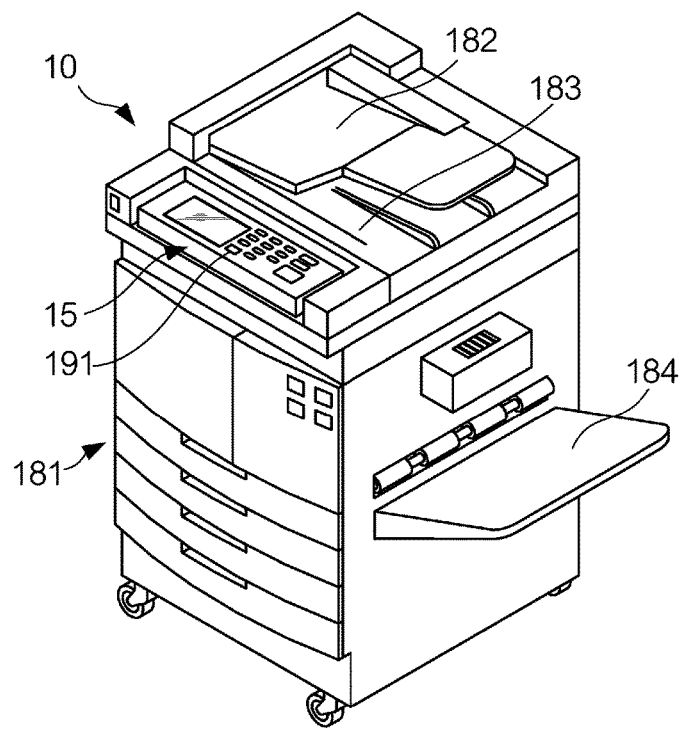
FIG. 2 illustrates an exterior appearance of the image processing apparatus.

FIG. 2 illustrates exterior appearance of the image processing apparatus 10. The image processing apparatus 10, which has a front face on the operation panel 15 side, is used by a user standing in front of the image processing apparatus 10. A paper feed tray 181 is provided on the front face side of the image processing apparatus 10. A document feeding unit 182 and a document receiving unit 183 are provided in an upper portion of the image processing apparatus 10, and a paper output unit 184 is provided on a side face side of the image processing apparatus 10.

A sheet of paper on which an image is to be formed is stored in the paper feed tray 181, and a document to be scanned is placed on the document feeding unit 182. Each of the paper feed tray 181 and the document feeding unit 182 is an example of a sheet feed unit that feeds a sheet of paper to the processing units such as the image scanner 16 and the printer 17. A scanned document is discharged to the document receiving unit 183, and a sheet of paper on which an image has been formed is output to the paper output unit 184. Each of the document receiving unit 183 and the paper output unit 184 is an example of an output unit to which a sheet of paper processed by the processing unit is to be output.

A lens 191 of the digital camera 19 is provided in the operation panel 15. The digital camera 19 takes an image of a user in front of the image processing apparatus 10 through the lens 191.

Figure 3:
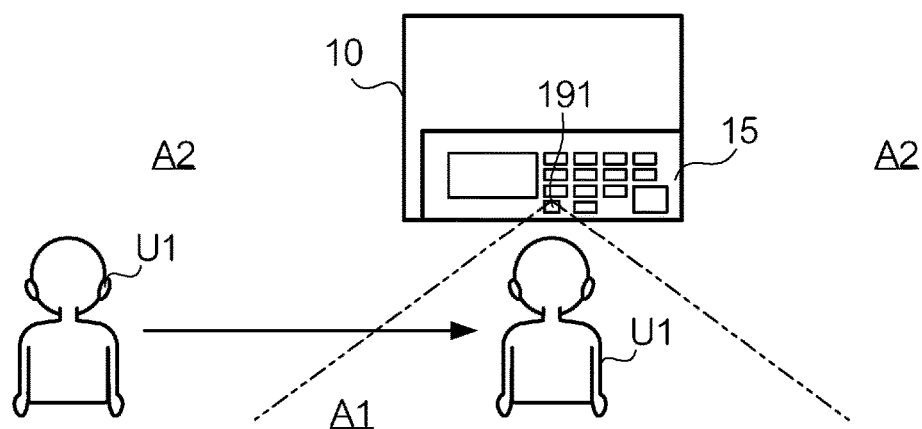
FIG. 3 illustrates an example of an angle of view of a digital camera.

FIG. 3 illustrates an example of an angle of view of the digital camera 19. In FIG. 3, a region sandwiched between the lines with alternate long and two short dashes in front of the image processing apparatus 10 is an imaging region A1 imaged by the digital camera 19, and a region outside the imaging region A1 is an outside region A2.

For example, when a user U1 who is in the outside region A2 tries to use the image processing apparatus 10, the user U1 enters the imaging region A1 and stands in front of the image processing apparatus 10 in order to operate the operation panel 15. The digital camera 19 is positioned and directed so as to be capable of taking an image of a user using the image processing apparatus 10.

Figure 4:
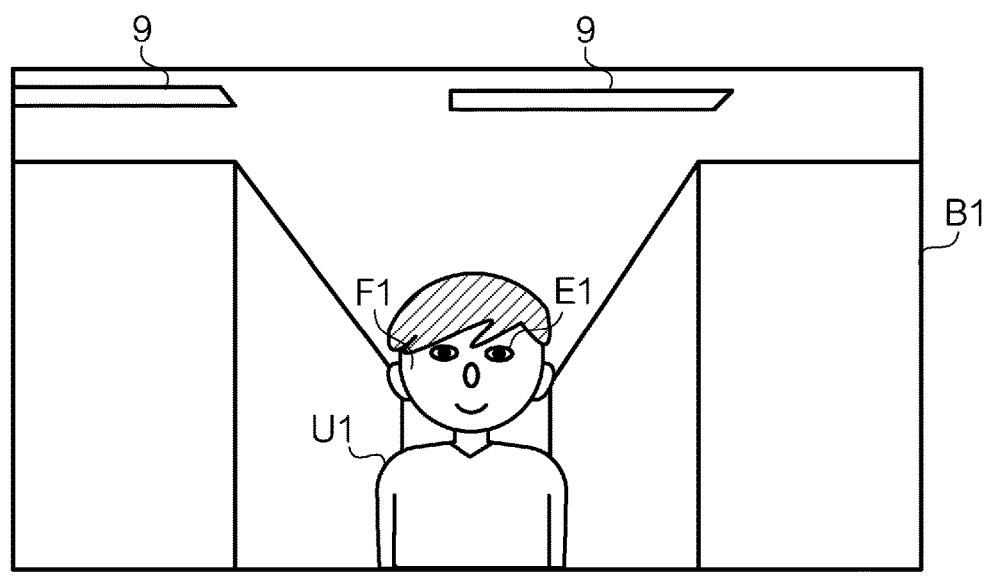
FIG. 4 illustrates an example of a taken image.

FIG. 4 illustrates an example of a taken image. In FIG. 4, an image B1 showing a face F1 and an eye E1 of the user U1 is illustrated. The operation panel 15 of the image processing apparatus 10 is provided at a height lower than the height of an adult person so that a user can easily operate the operation panel 15. The lens 191 of the digital camera 19 that is provided in the operation panel 15 is, for example, directed up toward the face of a user. Accordingly, a ceiling and fluorescent light tubes 9 on the ceiling are within the image B1.

Figure 5:
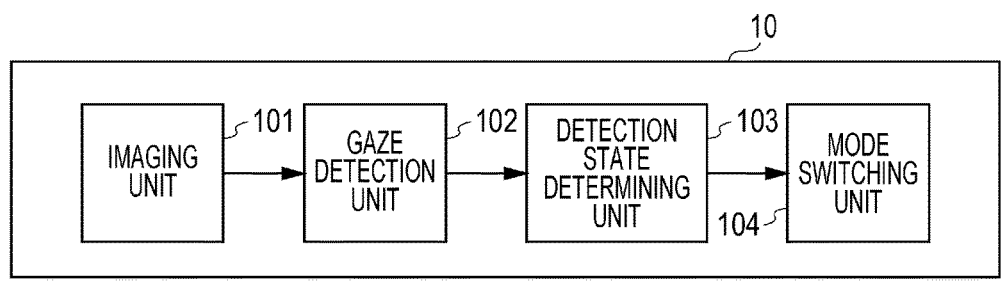
FIG. 5 illustrates a functional configuration realized by the image processing apparatus.

The CPU 11 of the image processing apparatus 10 controls each unit by executing a program, and thus the following functions are accomplished. FIG. 5 illustrates a functional configuration realized by the image processing apparatus 10. The image processing apparatus 10 includes an imaging unit 101, a gaze detection unit 102, a detection state determining unit 103, and a mode switching unit 104. The imaging unit 101 is a function of taking an image of surroundings of the image processing apparatus 10 and is realized, for example, by the CPU 11 and the digital camera 19 illustrated in FIG. 1.

The imaging unit 101 takes an image including the face of a user using the image processing apparatus 10 as illustrated in FIG. 4 by imaging the imaging region A1 illustrated in FIG. 3. The imaging unit 101 takes an image repeatedly in a specific cycle. The fluorescent light tubes 9 within the image taken by the imaging unit 101 blink at a frequency (e.g., 100 Hz if a household power source is 50 Hz) that is two times as high as the frequency of a household power source. A timing at which the imaging unit 101 takes an image may be, for example, within a period in which the fluorescent light tubes 9 are not emitting light so that the image is less influenced by backlight.

Figure 6:
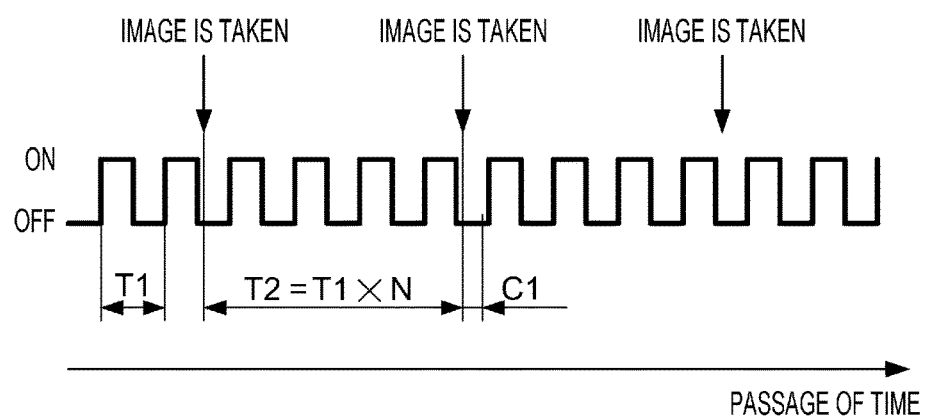
FIG. 6 illustrates an example of timings at which an image is taken.

FIG. 6 illustrates an example of timings at which an image is taken. As illustrated in FIG. 6, the fluorescent light tubes 9 are repeatedly turned on and off in a cycle T1. Meanwhile, the imaging unit 101 repeatedly takes an image in a sampling cycle T2. The cycle T2 is (cycle T1×N) where N is a natural number. The imaging unit 101 takes an image in a sampling period C1 that is within a period in which the fluorescent light tubes 9 are off (not emitting light). If an ON period and an OFF period are each a half of the cycle T1, the sampling period C1 is shorter than (cycle T1÷2) (the sampling period C1 is, for example, ¹⁄₂₅₀ seconds or ¹⁄₅₀₀ seconds, which is shorter than 0.005 seconds when the cycle T1 is 0.01 seconds at a frequency 100 Hz). The imaging unit 101 supplies a taken image to the gaze detection unit 102.

The gaze detection unit 102 is a function of detecting a gaze toward the image processing apparatus 10 and performs operation for detecting a gaze (gaze detection operation). The gaze detection unit 102 is an example of a "gaze detection unit" of the present invention. The gaze detection unit 102 analyzes the image supplied from the imaging unit 101 and detects a gaze on the basis of a positional relationship between a reference point (e.g., an inner corner of an eye) and a moving point (e.g., an iris) since an image is taken by using visible light in the present exemplary embodiment. That is, the gaze detection unit 102 detects the gaze on the basis of an image of the surroundings of the image processing apparatus 10.

In cases where an image is taken by using infrared rays, the gaze detection unit 102 may detect a gaze by using corneal reflection as a reference point and using a pupil as a moving point. Alternatively, the gaze detection unit 102 may detect a gaze by using other known techniques.

In the present exemplary embodiment, the gaze detection unit 102 detects a gaze toward a predetermined position. The predetermined position is, for example, a position of the image processing apparatus 10 to which a user pays attention. Specifically, the predetermined position is the operation panel 15, the paper feed tray 181, the document feeding unit 182, the document receiving unit 183, and the paper output unit 184 illustrated in FIG. 2. The gaze detection unit 102 stores therein coordinates of these attention positions and supplies, as detection result information, information indicating that the gaze is directed toward the image processing apparatus 10 to the detection state determining unit 103 in cases where the detected gaze is directed toward any one of the attention positions or approximately toward the image processing apparatus 10. The gaze detection unit 102 determines that a gaze toward the image processing apparatus 10 has been detected, for example, in cases where a gaze toward the image processing apparatus 10 is detected for a predetermined period.

In cases where a detected gaze is not directed toward any of the attention positions or toward the image processing apparatus 10 or in cases where a gaze itself is not detected, the gaze detection unit 102 supplies, as detection result information to the detection state determining unit 103, information indicating that a gaze toward any of the attention positions has not been detected. The gaze detection unit 102 performs the gaze detection operation every time an image is supplied from the imaging unit 101 and supplies detection result information to the detection state determining unit 103 each time.

The detection state determining unit 103 determines whether or not a switching condition on which the mode of the image processing apparatus 10 is switched from a normal mode to an energy-saving mode has been satisfied on the basis of a state of detection of a gaze by the gaze detection unit 102. The normal mode is a mode in which electric power is supplied to each unit of the image processing apparatus 10 so that each unit can operate in an ordinary manner. The energy-saving mode is a mode in which the number of units to which electric power is supplied is restricted or lower electric power is supplied than in the normal mode so that electric power consumption is saved as much as possible. In the energy-saving mode, electric power consumption is smaller than the electric power consumption in the normal mode.

Even in the energy-saving mode, electric power is supplied to the units illustrated in FIG. 5, i.e., the imaging unit 101, the gaze detection unit 102, the detection state determining unit 103, and the mode switching unit 104. That is, the energy-saving mode is a mode in which at least the units illustrated in FIG. 5 operate. The state of the image processing apparatus 10 operating in the normal mode is an example of a "first state" of the present invention. The state of the image processing apparatus 10 operating in the energy-saving mode is an example of a "second state" of the present invention. Both of the first state and the second state are states of the image processing apparatus 10 concerning electric power consumption, and the second state is lower in electric power consumption than the first state.

The detection state determining unit 103 determines whether or not the switching condition for switching from the normal mode to the energy-saving mode has been satisfied, for example, on the basis of a state of detection of a gaze toward the attention positions or toward the image processing apparatus 10 by the gaze detection unit 102. Specifically, the detection state determining unit 103 determines that the switching condition has been satisfied in cases where a ratio of a period in which a gaze toward the attention positions or toward the image processing apparatus 10 is not detected by the gaze detection unit 102 to a predetermined detection period is equal to or higher than a threshold value.

For example, assuming that the predetermined detection period is 3 seconds, the ratio is 50%, and the sampling cycle T2 is 0.1 seconds, the detection state determining unit 103 determines that the switching condition has been satisfied in cases where 15 or more pieces of detection result information indicate that a gaze toward any of the attention positions or toward the image processing apparatus 10 has not detected out of 30 pieces of detection result information that are supplied in 3 seconds after detection result information indicating that a gaze toward any of the attention positions or toward the image processing apparatus 10 has been detected is supplied from the gaze detection unit 102 and determines that the switching condition has not been satisfied in cases where less than 15 pieces of detection result information indicate that a gaze toward any of the attention positions or toward the image processing apparatus 10 has not detected out of the 30 pieces of detection result information. In cases where the detection state determining unit 103 determines that the switching condition has been satisfied, the detection state determining unit 103 notifies the mode switching unit 104 about satisfaction of the switching condition.

The mode switching unit 104 is a function of switching the mode of the image processing apparatus 10. The mode switching unit 104 switches the normal mode to the energy-saving mode in accordance with a state of detection by the gaze detection unit 102.

Specifically, the mode switching unit 104 switches the normal mode to the energy-saving mode in cases where the image processing apparatus 10 is not executing a specific kind of processing and where the mode switching unit 104 is notified about satisfaction of the switching condition by the detection state determining unit 103. By thus switching the mode, the mode switching unit 104 controls the image processing apparatus 10 to shift from the first state to the second state. The mode switching unit 104 is an example of a "controller" of the present invention.

The image processing apparatus 10 performs mode switching processing for switching the mode on the basis of the above configuration.

Figure 7:
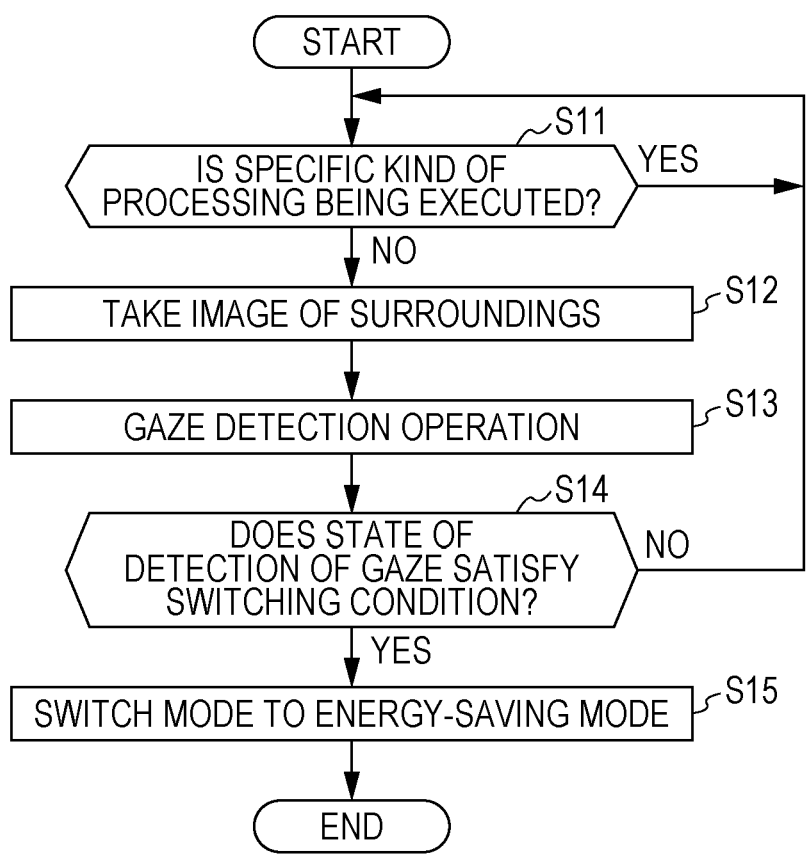
FIG. 7 illustrates an example of an operation procedure of the image processing apparatus in mode switching processing.

FIG. 7 illustrates an example of an operation procedure of the image processing apparatus 10 in the mode switching processing. This operation procedure is performed when the image processing apparatus 10 is in the normal mode. First, the image processing apparatus 10 (the imaging unit 101) determines whether or not the image processing apparatus 10 is executing a specific kind of processing (Step S11). The specific kind of processing is, for example, processing such as formation of an image by the printer 17 or reading of an image by the image scanner 16, and information indicative of the kind of such processing is preset in a program. In cases where the image processing apparatus 10 (the imaging unit 101) determines in Step S11 that a specific kind of processing is being executed (YES), the processing returns to Step S11. Meanwhile, in cases where the image processing apparatus 10 (the imaging unit 101) determines in Step S11 that a specific kind of processing is not being executed (NO), the processing proceeds to Step S12.

Next, the image processing apparatus 10 (the imaging unit 101) takes an image of surroundings of the image processing apparatus 10 (Step S12). Next, the image processing apparatus 10 (the gaze detection unit 102) performs the gaze detection operation for detecting a gaze toward the attention positions (Step S13). Subsequently, the image processing apparatus 10 (the detection state determining unit 103) determines whether or not a state of detection of a gaze satisfies the switching condition (Step S14).

In cases where the image processing apparatus 10 determines in Step S14 that the switching condition is not satisfied (NO), the processing returns to Step S11, in which the image processing apparatus 10 continues the operation. In cases where the image processing apparatus 10 determines in Step S14 that the switching condition is satisfied (YES), the image processing apparatus 10 (the mode switching unit 104) switches the mode thereof from the normal mode to the energy-saving mode (Step S15). The above is the operation of the image processing apparatus 10.

It is known that a user shifts an apparatus to an energy-saving mode by pressing an energy-saving button after using the apparatus. In this case, however, the user needs to operate the button by touching the apparatus. Therefore, if the user forgets to press the button or does not know this function itself, the apparatus cannot be shifted into the energy-saving mode, and as a result the apparatus uselessly continues to consume electric power. Furthermore, it is known that an apparatus automatically shifts to an energy-saving mode when continuation of absence of an operation for a predetermined period is detected by a timer or the like. However, if the predetermined period is set long, the apparatus seldom shifts to the energy-saving mode. Conversely, if the predetermined period is set short, the apparatus undesirably shifts to the energy-saving mode while a user is hesitating how to operate the apparatus. Furthermore, in the case of detection using a human detection sensor, even a passerby who passes a detection range of the sensor is detected. Since a person who has no intention to operate an apparatus is erroneously detected if the apparatus is placed close to a desk or an entrance, the apparatus seldom shifts to an energy-saving mode.

Meanwhile, in the present exemplary embodiment, the mode is shifted from the normal mode to the energy-saving mode in cases where a ratio of a period in which a gaze toward any of the attention positions or toward the image processing apparatus 10 is not detected to a predetermined detection period is equal to or higher than a threshold value. According to this configuration, the mode is shifted to the energy-saving mode after an operation is finished without depending on setting of a period in which the mode is shifted to the energy-saving mode and a person around who has no intention to operate the apparatus.

Furthermore, in the present exemplary embodiment, response speed and accuracy of recognition are adjusted depending on a situation of use by adjusting the number of times of sampling of detection of a gaze. This prevents a glance of a person who has no intention to operate the apparatus from being erroneously detected, thereby preventing a shift to the energy-saving mode from being hindered under a circumference where persons frequently go by.

Furthermore, in the present exemplary embodiment, even if a user's gaze is deviated from the apparatus, the mode is not shifted to the energy-saving mode if a gaze of a next user who is waiting is detected. This allows the apparatus to efficiently work.

[2] Modifications

The above exemplary embodiment is merely an example of the present invention and can be modified as follows. The exemplary embodiment and the modifications may be combined as needed.

[2-1] Detection Period

In the exemplary embodiment, the detection period used to determine whether or not the switching condition is satisfied may be changed. For example, the detection period may be a period that varies depending on the position of an eye for which a gaze has been detected in an image used for detection of a gaze toward the attention positions by the gaze detection unit 102. In this case, the image is divided into plural regions, and region information indicative of the divided regions is stored in the image processing apparatus 10.

Figure 8:
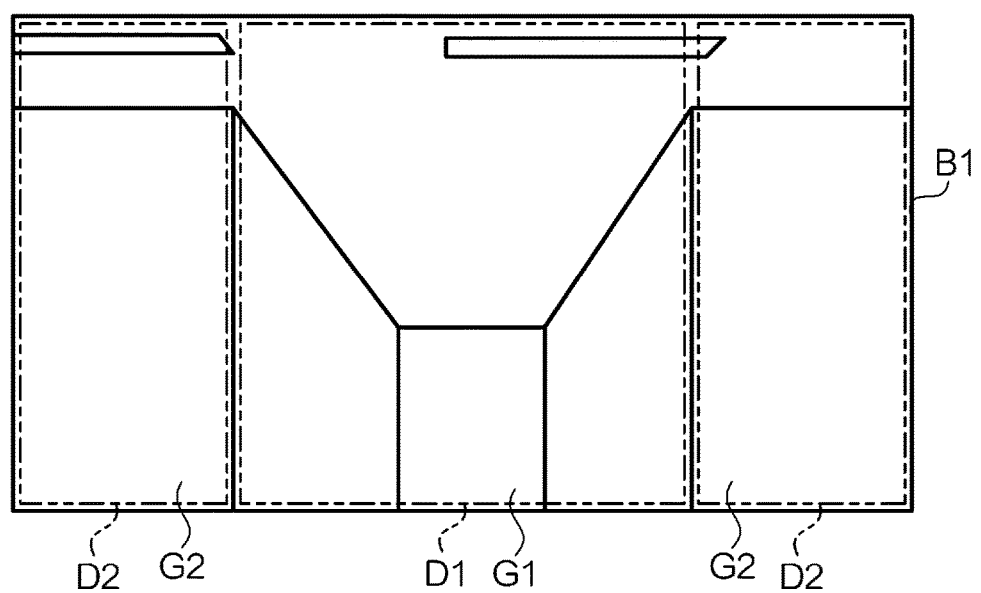
FIG. 8 illustrates an example of divided regions.

FIG. 8 illustrates an example of the divided regions. In the example of FIG. 8, an image B1 taken by the imaging unit 101 is illustrated. The image B1 shows a hallway G1 extending in a front direction of the image processing apparatus 10 and a hallway G2 extending in a left-right direction of the image processing apparatus 10. In this example, the image is divided into a region D1 showing the hallway G1 and a region D2 that is a region showing the hallway G2 other than the region D1.

Figure 9:
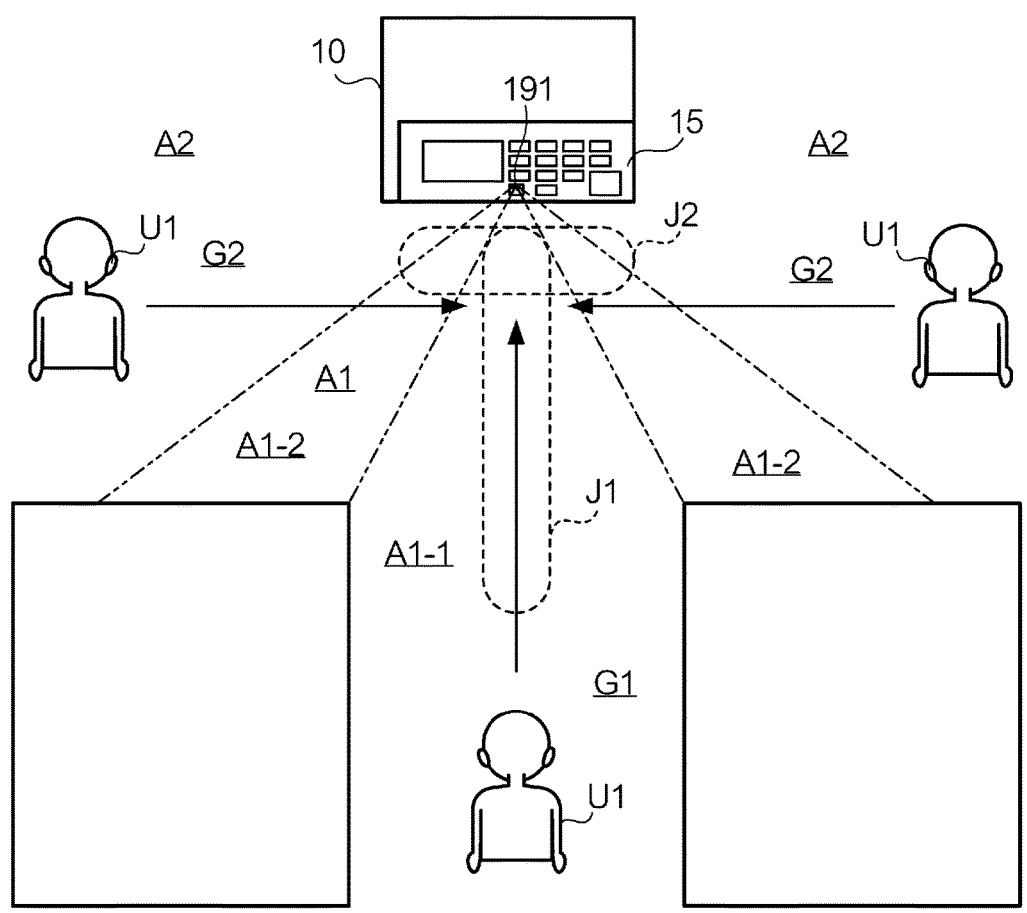
FIG. 9 illustrates an example of a relationship between users' routes and divided regions.

FIG. 9 illustrates an example of a relationship between users' routes and the divided regions. In FIG. 9, the hallways G1 and G2 viewed from the ceiling side, an imaging region A1-1, an imaging region A1-2, and an outside region A2 are illustrated. Of the real-space region imaged by the imaging unit 101, the imaging region A1-1 is a region shown in the region D1 of FIG. 8. Of the real-space region imaged by the imaging unit 101, the imaging region A1-2 is a region shown in the region D2 of FIG. 8.

In cases where a user U1 who tries to use the image processing apparatus 10 passes the hallway G1, a gaze of the user U1 who is in a region J1 of FIG. 9 is detected if the gaze is directed toward any of the attention positions of the image processing apparatus 10. Meanwhile, in cases where the user U1 passes the hallway G2, a gaze of the user U1 who is in a region J2 of FIG. 9 is detected if the gaze is directed toward any of the attention positions of the image processing apparatus 10. The region J1 is larger than the region J2 since an image of the user U1' face is taken from a longer distance in the cases where the user U1 passes the hallway G1 than in the cases where the user U1 passes the hallway G2.

The detection state determining unit 103 according to the present modification uses a detection period table in which regions in an image and detection periods are associated.

FIG. 10 illustrates an example of the detection period table. In the example of FIG. 10, a detection period "H1" is associated with the region "D1" of FIG. 8, and a detection period "H2" (H2<H1) is associated with the region "D2" of FIG. 8. The detection state determining unit 103 determines whether or not the switching condition is satisfied by using H1 as the detection period, for example, when the position of an eye is within the region D1 at the time of the first detection of a gaze toward any of the attention positions. Meanwhile, the detection state determining unit 103 determines whether or not the switching condition is satisfied by using H2 as the detection period if the position of an eye is within the region D2 at the time of the first detection of a gaze toward any of the attention positions.

The detection state determining unit 103 may determine whether or not the switching condition is satisfied, for example, by using the position of an eye at the time of the second detection or a middle of positions of an eye at initial two detections instead of the position of an eye at the time of the first detection. In any of the cases, the mode switching unit 104 switches the mode when after detection of a gaze, the gaze is detected in gaze detection operations at a condition-dependent ratio to gaze detection operations performed during a detection period that varies depending on the position of an eye for which the gaze has been detected in a taken image.

If the longer detection period H1 that corresponds to the length of the region J1 of FIG. 9 is used in any cases, a user who comes to the front of the image processing apparatus 10 through the hallway G2 need to wait for switching of the mode for a longer period than in cases where the detection period H2 is used. Meanwhile, if the shorter detection period H2 that corresponds to the length of the region J2 is used, the mode is more frequently switched by detection of a gaze of a user who comes through the hallway G1 but goes through the hallway G2 by passing in front of the image processing apparatus 10 than in cases where the detection period H1 is used.

In the present modification, a period that varies depending on the position of an eye for which a gaze has been detected in a taken image is used as the detection period. This shortens a period for which a user waits for switching of the mode and makes switching of the mode by detection of a gaze of a user who does not use the image processing apparatus 10 less frequent. Note that a period that varies depending on the position of an eye may be also used for the switching condition. This also shortens a period for which a user waits for switching of the mode and makes erroneous switching of the mode less frequent.

[2-2] Detection of Approach

The image processing apparatus may include a human detection sensor that detects approach of a user.

FIG. 11 illustrates a hardware configuration of an image processing apparatus 10a according to the present modification. The image processing apparatus 10a includes a human detection sensor 20 in addition to the hardware illustrated in FIG. 1. The human detection sensor 20 is a sensor that detects approach of a person by measuring the amount of reflection of infrared rays, an ultrasonic wave, visible light, or the like. The human detection sensor 20 that has measured the amount of reflection indicating approach of a person notifies the CPU 11 about approach of a person.

FIG. 12 illustrates a functional configuration realized by the image processing apparatus 10a. The image processing apparatus 10a includes an approach detection unit 105 and an operation start instruction unit 106 in addition to the units illustrated in FIG. 5. The approach detection unit 105 detects approach of a person to the image processing apparatus 10a. The approach detection unit 105 is an example of an "approach detection unit" of the present invention. Upon detection of approach of a person due to the function of the human detection sensor 20, the approach detection unit 105 notifies the operation start instruction unit 106 of the approach.

In cases where the approach detection unit 105 detects approach of a person, the operation start instruction unit 106 instructs the imaging unit 101, the gaze detection unit 102, the detection state determining unit 103, and the mode switching unit 104 to start operation. For example, the approach detection unit 105 is realized by a camera. For example, the approach detection unit 105 monitors a toe of an approaching person. In cases where the toe is directed toward the image processing apparatus 10a, a gaze of the person is detected. It is therefore possible to increase the accuracy of determination as to whether or not the person uses the image processing apparatus 10a.

Furthermore, the direction of the face of an approaching person may be monitored instead of a toe of an approaching person. In cases where the face is directed toward the image processing apparatus 10a, a gaze of the person is detected. It is therefore possible to increase the accuracy of determination as to whether or not the person uses the image processing apparatus 10a. In an image processing apparatus that includes an authentication processing unit, an authentication process may be omitted by using, for authentication, a face used to determine the direction of the face or iris of an eye used in the gaze detection unit.

Upon receipt of this instruction, the imaging unit 101 starts taking an image of surroundings, and the gaze detection unit 102 starts a gaze detection operation upon detection of approach of a person to the image processing apparatus 10a by the approach detection unit 105. As a result, the gaze detection unit 102 detects a gaze of a person detected by the approach detection unit 105 toward the image processing apparatus 10a. Furthermore, the detection state determining unit 103 starts determining a state of detection of a gaze, and the mode switching unit 104 starts the operation of switching the mode. After the instruction given by the operation start instruction unit 106, the approach detection unit 105 and the operation start instruction unit 106 finish the operation.

According to the configuration, it is not until approach of a person to the image processing apparatus 10a that the imaging unit 101 performs the imaging operation and the gaze detection unit 102 performs the gaze detection operation. Furthermore, for example, when the units illustrated in FIG. 5 consume more electric power than the operation of the approach detection unit 105 and the operation of the operation start instruction unit 106, electric power consumption in the energy-saving mode is reduced as compared with the case where the units illustrated in FIG. 5 perform the operation even after switching to the energy-saving mode.

[2-3] Gaze Detection

In the exemplary embodiment, an example in which the gaze detection unit 102 detects a gaze toward any of the attention positions has been described. Alternatively, the gaze detection unit 102 may detect, as a gaze for use of the image processing apparatus 10, not only a gaze toward local attention positions, but also a gaze toward the entire image processing apparatus 10.

[2-4] Taking of Image

The image processing apparatus need not take an image.

Figure 13:
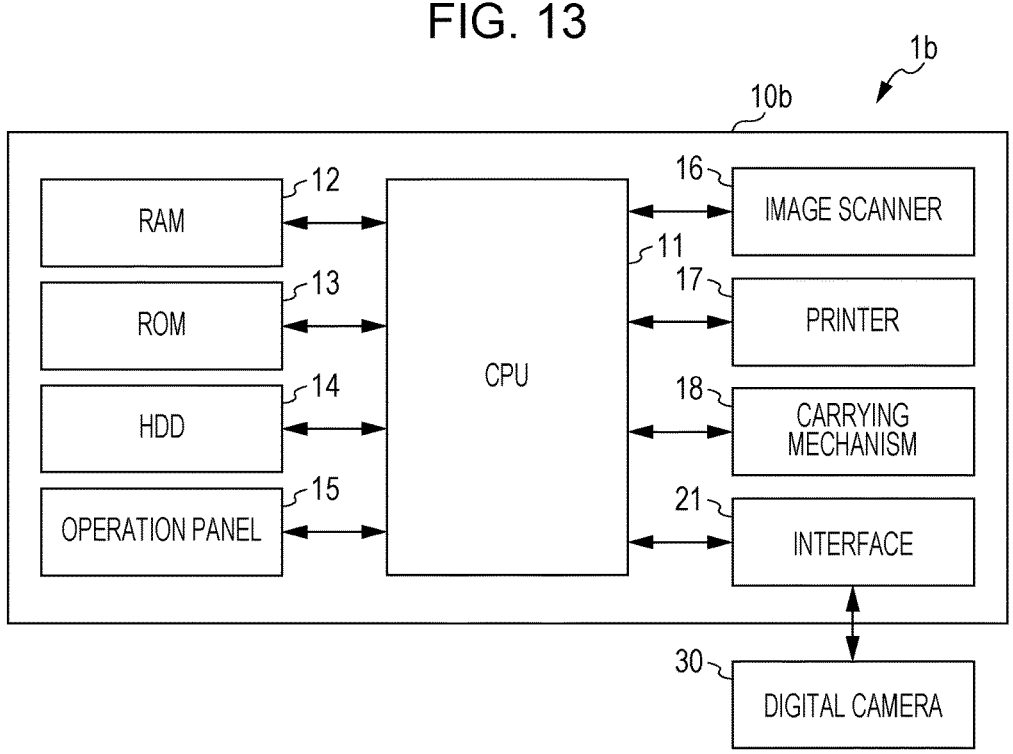
FIG. 13 illustrates a hardware configuration of an image processing system according to a modification.

FIG. 13 illustrates a hardware configuration of an image processing system 1b according to the present modification. The image processing system 1b includes an image processing apparatus 10b and a digital camera 30. The image processing apparatus 10b includes the CPU 11 through the carrying mechanism 18 illustrated in FIG. 1 and an interface 21.

The interface 21 relays data exchange with the digital camera 30. The digital camera 30 is placed around the image processing apparatus 10b and takes an image of surroundings of the image processing apparatus 10b that include a position where a user who tries to use the image processing apparatus 10b stands.

Figure 14:
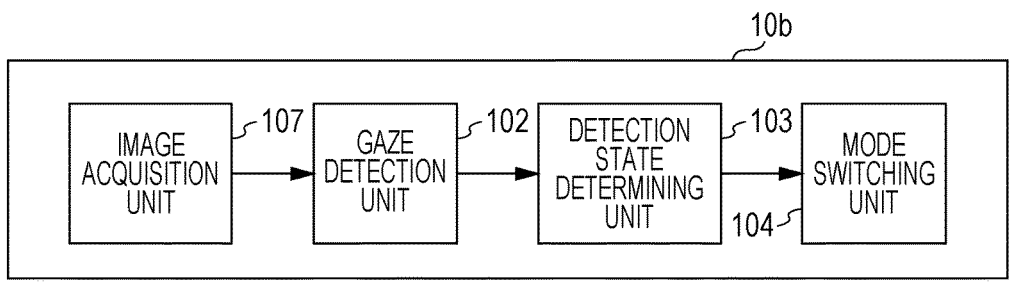
FIG. 14 illustrates a functional configuration realized by the image processing apparatus.

FIG. 14 illustrates a functional configuration realized by the image processing apparatus 10b. The image processing apparatus 10b includes a gaze detection unit 102, a detection state determining unit 103, a mode switching unit 104, and an image acquisition unit 107. The image acquisition unit 107 acquires an image of surroundings of the image processing apparatus 10b from an external imaging device (the digital camera 30 in this example). The gaze detection unit 102 performs a gaze detection operation on the basis of the image acquired by the image acquisition unit 107, i.e., the image of surroundings of the image processing apparatus 10b.

[2-5] Mode

The modes between which the mode switching unit 104 switches are not limited to the modes described in the exemplary embodiment. For example, in the exemplary embodiment, the normal mode is a mode in which electric power supply to each unit of the image processing apparatus 10 is not restricted. However, the normal mode may be a mode in which electric power supply is restricted as for a specific function. Furthermore, in the energy-saving mode, electric power may be supplied to a function other than the units illustrated in FIG. 5. In any case, the mode switching unit 104 need just switch the mode from the first mode to the second mode in accordance with a state of detection by the gaze detection unit 102 (electric power consumption in the first mode is larger than the electric power consumption in the second mode).

[2-6] Information Processing Apparatus

In the above exemplary embodiment and modifications, an image processing apparatus that performs image processing has been described. However, the present invention is not limited to this and may be another kind of information processing apparatus. For example, in cases where the present invention is applied to an information processing apparatus, such as a kiosk terminal, an automatic teller machine (ATM), or an automatic vending machine, placed at a place where an indefinite large number of users visit, the mode is conveniently hardly switched just because a person passes by, as described in the exemplary embodiment.

[2-7] Categories of Invention

The present invention can be regarded not only as an information processing apparatus that realizes the units illustrated in FIG. 5 like the aforementioned image processing apparatus, but also as an information processing method for realizing processes performed by the information processing apparatus or a program for causing a computer that controls the information processing apparatus to function. This program may be provided in the form of a recording medium such as an optical disc in which the program is stored or may be provided in a manner such that the program is downloaded and installed into a computer over a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an imaging unit configured to capture image of an area around the information processing apparatus;
   a processor programmed to function as:
   a controller that controls the information processing apparatus to shift from a first state concerning electric power consumption to a second state in which electric power consumption is smaller than the electric consumption in the first state; and
   a gaze detection unit that detects a gaze toward the information processing apparatus, determines for each image captured by the imaging unit during a predetermined detection period whether the image includes a gaze toward the information processing unit, and determines a gaze has not been detected when a ratio of a number of images that do not include a gaze toward the information processing apparatus to all images captured by the imaging unit during the predetermined detection period is equal to or higher than a predetermined threshold, and
   wherein the controller controls the information processing apparatus to shift from the first state to the second state in response to the information processing apparatus being in the first state and the gaze detection unit not having detected a gaze toward the information processing apparatus.

2. The information processing apparatus according to claim 1, wherein
   the controller controls the information processing apparatus to shift from the first state to the second state in a case where the information processing apparatus is not executing a specific kind of processing and where the gaze detection unit has not detected a gaze toward the information processing apparatus.

3. The information processing apparatus according to claim 1, wherein the processor is further programmed to function as an authenticating unit that authenticates a person by using a face or an iris of the person whose gaze has been detected.

4. The information processing apparatus according to claim 1, wherein the processor is further programmed to function as an approach detection unit that detects approach of a person to the information processing apparatus,
   wherein the gaze detection unit detects a gaze of the person detected by the approach detection unit toward the information processing apparatus.

5. The information processing apparatus according to claim 4, wherein
   the approach detection unit detects approach of a person toward the information processing apparatus on a basis of a direction of a toe of the person.

6. The information processing apparatus according to claim 4, wherein
   the approach detection unit detects approach of a person toward the information processing apparatus on a basis of a direction of a face of the person.

7. An image processing apparatus comprising:
   an image processing unit;
   an imaging unit configured to capture images of an area around the information processing apparatus; and
   a processor programmed to function as:
   a controller that controls the image processing unit to shift from a first state concerning electric power consumption to a second state in which electric power consumption is smaller than the electric power consumption in the first state; and
   a gaze detection unit that detects a gaze toward the image processing apparatus, determines for each image captured by the imaging unit during a predetermined detection period whether the image includes a gaze toward the information processing unit, and determines a gaze has not been detected when a ratio of a number of images that do not include a gaze toward the information processing apparatus to all image captured by the imaging unit during the predetermined detection period is equal to or higher than a predetermined threshold, and
   wherein the controller controls the image processing unit to shift from the first state to the second state in response to the information processing apparatus being in the first state and the gaze detection unit not having detected a gaze toward the image processing apparatus.

* * * * *